United States Patent [19]

Albritton

[11] Patent Number: 5,722,197
[45] Date of Patent: Mar. 3, 1998

[54] CLOSURE FOR A FISHERMAN'S LIVE WELL

[76] Inventor: John J. Albritton, P.O. Box 477, Clewiston, Fla. 33440

[21] Appl. No.: 658,638

[22] Filed: Jun. 5, 1996

[51] Int. Cl.⁶ .................... A01K 97/05; A01K 97/20
[52] U.S. Cl. ............................................ 43/55; 43/56
[58] Field of Search ................... 43/55, 56, 54.1; 220/229

[56] References Cited

U.S. PATENT DOCUMENTS

| | | | |
|---|---|---|---|
| 1,490,868 | 4/1924 | Voell | 43/55 |
| 2,241,314 | 5/1941 | Mohler | 43/55 |
| 2,597,002 | 5/1952 | Johnson et al. | 43/55 |
| 3,025,629 | 3/1962 | Sears | 43/55 |
| 3,143,263 | 8/1964 | Farmer | 43/55 |
| 3,559,329 | 2/1971 | Chiu | 43/55 |
| 4,890,413 | 1/1990 | Nelson | 43/55 |
| 5,191,732 | 3/1993 | Berdinsky et al. | 43/55 |
| 5,212,902 | 5/1993 | Moorhead et al. | 43/55 |

*Primary Examiner*—Joseph J. Hail, III
*Attorney, Agent, or Firm*—William E. Noonan

[57] ABSTRACT

A closure is provided for a fisherman's live well. The closure includes a flexible element that is mounted proximate an entrance of the live well. The flexible element is held such that it extends across and generally covers the entrance of the live well. There is a self-closing opening is formed through the flexible element. The opening is formed by an elastic component that urges the opening into a closed condition and that is selectively expandable to expose the opening and provide access to the live well through the opening.

6 Claims, 4 Drawing Sheets

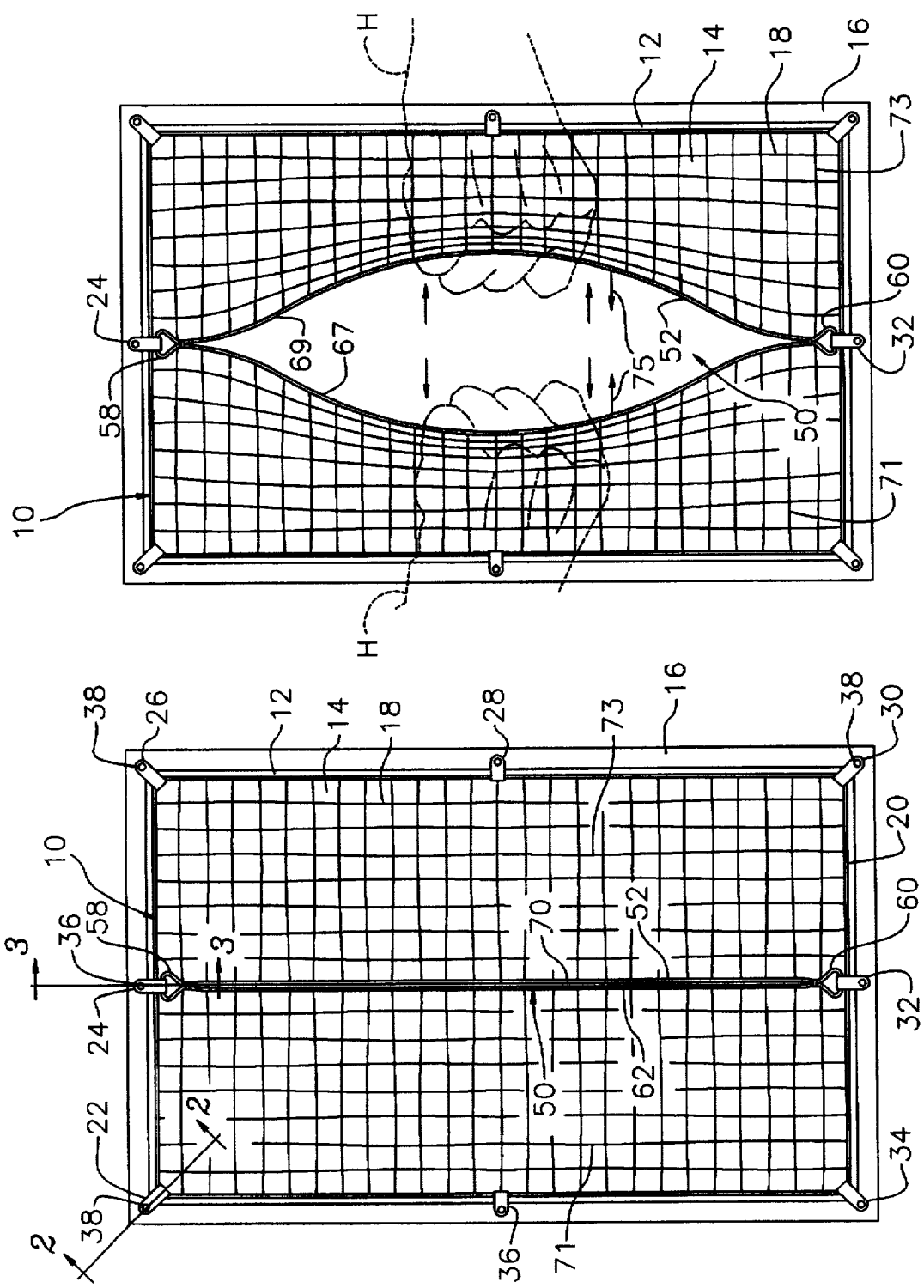

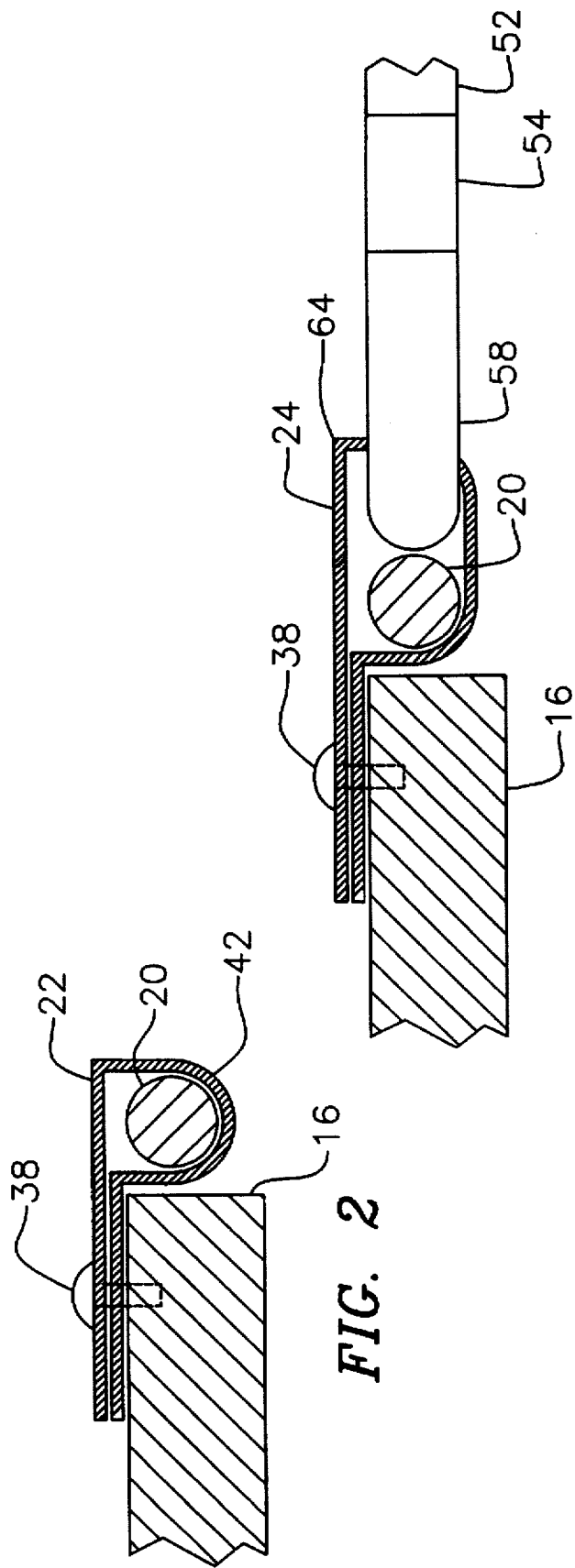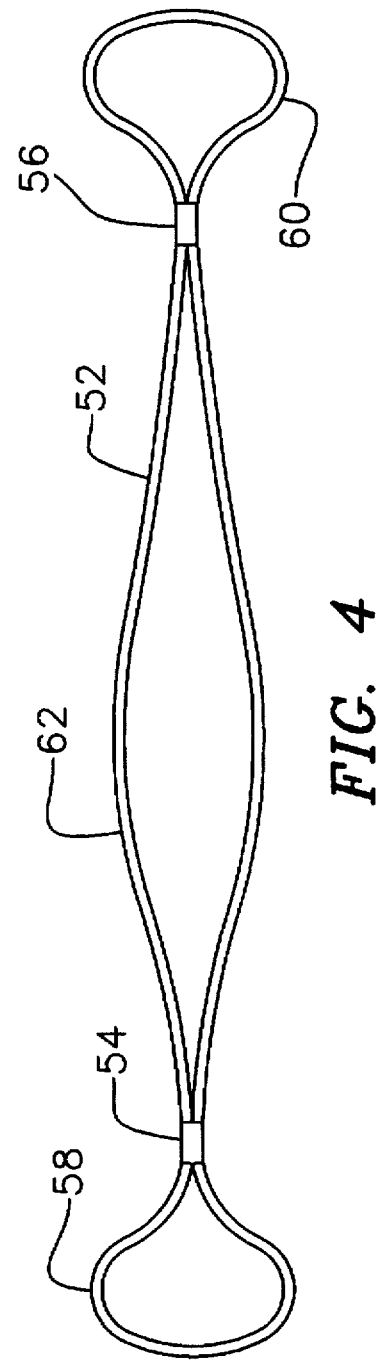

CLOSURE FOR A FISHERMAN'S LIVE WELL

FIELD OF THE INVENTION

This invention relates to a closure for a fisherman's live well and, more particularly, to a self-closing netting system for covering live wells of the type found in fishing boats.

BACKGROUND OF THE INVENTION

Fishing boats often include a built-in chamber or compartment known as a live well, which holds freshly caught fish. Typically, the live well is built into the fishing vessel. Such wells are particularly popular in bass boats and other types of sport and commercial fishing vessels. The well is filled with fresh or salt water and fish that are caught are deposited immediately into the live well. The live well keeps caught fish alive and fresh until they are returned to shore.

Conventional live wells usually include a chamber that is covered by a hinged door. While the door is closed, the fish deposited in the live well are held in darkness. When the door is suddenly opened and light enters the live well, those fish are apt to jump instinctively toward the light and the opening. As a result, it is not uncommon for fish to jump out of the well and be lost off the boat. This problem can occur any time the fisherman is required to open the live well in order to introduce or remove fish that have been caught. Fish also tend to escape from the live well if the well door is inadvertently left open.

SUMMARY OF INVENTION

It is therefore an object of this invention to provide a closure for a fisherman's live well that securely holds fish within the live well and prevents them from jumping out of the live well and escaping the boat when the live well door is opened.

It is a further object of this invention to provide a live well closure that is self-closing so that it cannot be inadvertently left open.

It is a further object of this invention to provide a live well closure that is easy and reliable to operate.

It is a further object of this invention to provide a live well closure that permits all sizes of fish to be securely introduced into and removed from a live well with a minimal risk of escape.

It is a further object of this invention to provide a live well closure that may be adapted for use on all sizes of live wells and on virtually all types of commercial and sport fishing boats.

This invention features a closure for a fisherman's live well. The closure includes a flexible element and means mounted proximate an entrance of the live well for holding the flexible element such that the flexible element extends across and generally covers the entrance of the live well. There are means defining a self-closing opening through the flexible element, which opening includes elastic means that urge the opening into a closed condition and that are selectively expandable to expose the opening and provide access to the live well through the opening.

In a preferred embodiment, the flexible element includes a net or other mesh component. An elongate resilient member may extend generally peripherally about the net. The means for holding may include a plurality of connectors secured to a structure that bounds the entrance of the live well. Each connector engages and holds the elongate resilient member. The net may include an elongate slit through which the opening extends. Elastic means are attached to the net and disposed adjacent the slit.

The slit may separate a first edge of the net from an adjacent second edge of the net and the elastic means may include a first elongate elastic segment secured to the net and extending along a first edge and a second elongate elastic segment secured to the net and extending along the second edge. Means may be located proximate the ends of the slit for gripping the first and second elastic segments and holding the segments generally side by side such that the slit is closed. The elastic segments are selectively pulled apart to open the slit and expose the opening.

BRIEF DESCRIPTION OF THE DRAWINGS

Other objects, features and advantages will occur from the following description of preferred embodiments and the accompanying drawings, in which:

FIG. 1 is a plan view of the live well fishing closure of this invention, with the self-closing in a closed condition;

FIG. 2 is a cross sectional view taken along line 2—2 of FIG. 1;

FIG. 3 is a cross sectional view taken along line 3—3 of FIG. 1;

FIG. 4 is a perspective view of the elastic means defining the self-closing opening;

FIG. 5 is a view similar to FIG. 1 of the live well closure, with the self-closing opening in an expanded condition that provides access into the live well;

DETAILED DESCRIPTION OF PREFERRED EMBODIMENTS

Figure 6:
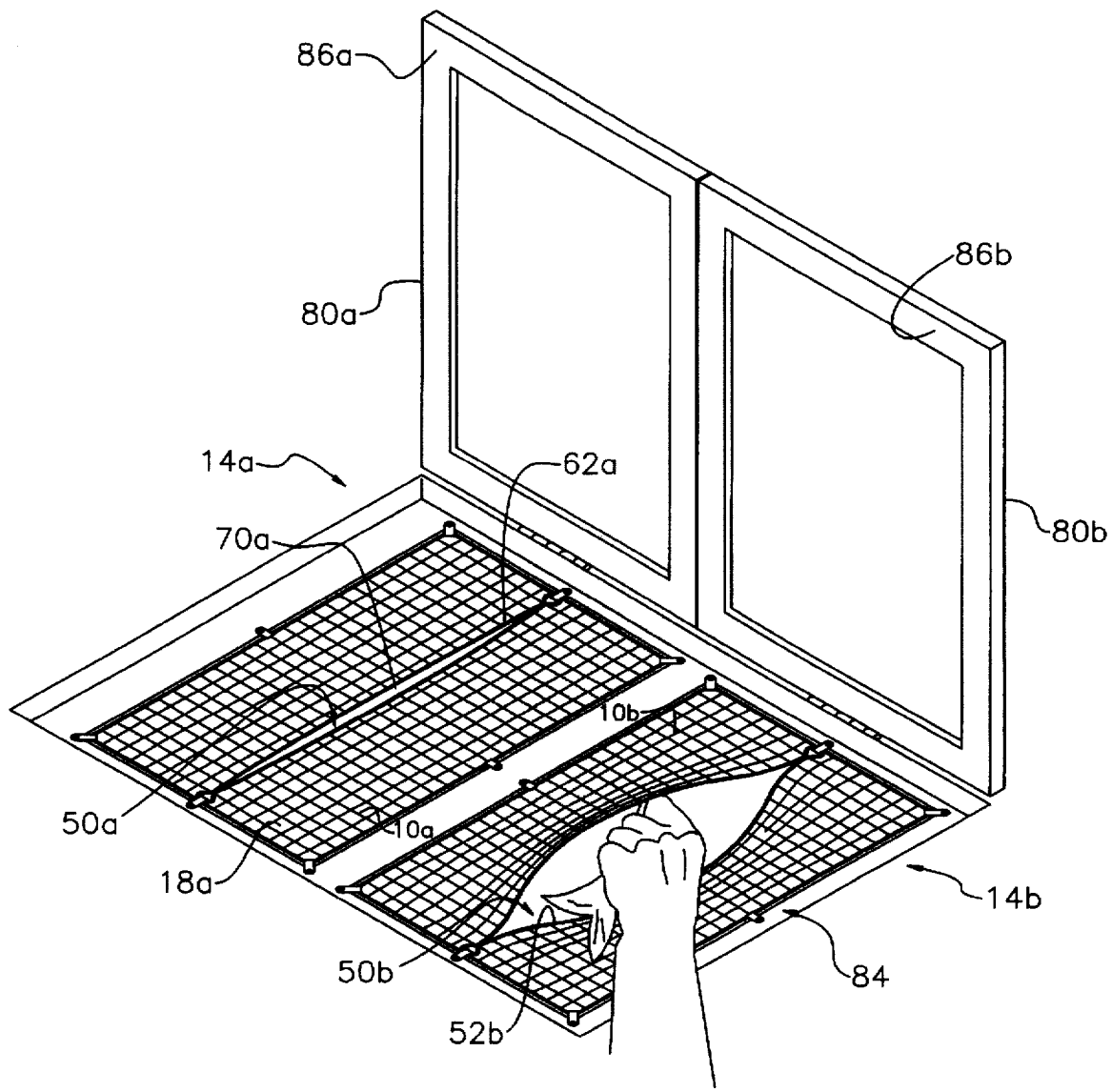
FIG. 6 is a perspective view of a pair of side by side live wells, having respective pivoting doors and respective closures in accordance with this invention; the left-hand closure is in the closed condition and the right-hand closure is opened for introducing the fish into or removing a fish from the live well.

There is shown in FIG. 1 a closure 10 for covering the entrance of a conventional fisherman's live well 12. The live well constitutes any of the various known types of live wells that are used in commercial and sport fishing vessels. Alternatively, live well 12 may be a portable container that is not built into the boat. The well includes an interior chamber or hold 14 that is filled with fresh or salt water for holding fish that are caught. The entrance of hold 14 is surrounded by a generally rectangular frame or molding 16. The closure of this invention may be adapted to various other live well shapes.

Closure 10 includes a net element 18 that extends across and generally covers the entrance to live well hold 14. Net element 18 comprises a nylon mesh or similar flexible material formed from natural or synthetic fibers. The element is constructed in a conventional manner using various net-making techniques. Although net element 18 is depicted as having a square mesh configuration, various other mesh shapes may be employed. Additionally, the mesh openings may feature various sizes, although the openings should be small enough to prevent the escape of fish contained in hold 14.

Net element 18 is attached to molding 16 such that the net element extends across the opening of the live well hold. In particular, an elongate resilient cord 20 extends peripherally about the net element. The individual, interwoven strands of net element 18 are sewn, stitched, tied or otherwise attached to the surrounding resilient cord. Cord 20 may be composed of various natural or man-made elastic substances. A plurality of plastic or metal connector elements 22, 24, 26, 28, 30, 32, 34 and 36 are secured to the upper surface of molding 16 by respective screws 38. These screws may extend into the surrounding fiberglass of the boat (not shown). Alternatively, molding can be eliminated and the connectors fastened directly to the boat. Resilient member 20 is held by these clips. Clip 22 is shown in cross section in FIG. 2. This clip, which represents the structure of each of clips 22, 26, 28, 30, 34 and 36, is attached to molding 16 by screw 38. The distal end of the clip includes a loop portion 42 through which resilient cord 20 is run. The resilient cord extends through each of clips in the manner shown in FIG. 2 such that the cord maintains a generally rectangular shape about the periphery of the entrance to live well hold 14 and in close proximity to the molding 16. Net element 18 is thereby maintained in an extended condition generally covering the opening to the live well. It should be noted that various alternative clip configurations and other devices may be used to hold cord 20 in the condition shown in FIG. 1. The precise construction of the connector is not a limitation of this invention.

Clips 24 and 32, which are located generally centrally along the short, lateral sides of the live well molding, are slightly larger than the remaining clips. In particular, each of clips 24 and 32 preferably includes a 5/16" loop 64, whereas the remaining clips include a 1/4" loop. Otherwise, all of the clips are constructed identically. As shown in FIG. 3, clip 24 (and analogously clip 32) is again attached by a screw 38 to molding 16. Peripheral cord 20 extends through loop 64 of clips 24 and 32.

Referring again to FIG. 1, a resilient, self-closing opening 50 is formed centrally and longitudinally through net element 18. Opening 50 is defined by an elastic cord 52 that is constructed in the form of a loop. The loop is attached at upper and lower points on the loop to clips 24 and 32, respectively. Elastic loop 52, shown alone in FIG. 4, is composed of various known elastic, cord-like materials. A pair of nylon wire ties 54 and 56 or similar fasteners pinch loop 52 proximate respective ends of the loop. Fasteners 54 and 56 are conventional metal or plastic components secured to the elastic loop 52 to define relatively small end loops 58 and 60 and a central section 62, which, in turn, defines the opening in the net.

As illustrated in FIG. 1, smaller end loop 58 is engaged with clip 24 and end loop 60 is similarly engaged with clip 32. As shown more particularly in FIG. 3, end loop 58 is received through the clip loop 64 formed at the end of clip 24. Opposite end loop 60 is similarly engaged with clip 32. Fasteners 54 and 56 are installed after loop 52 is attached to connectors 24 and 32. This tightens opening 50 to hold the net closed.

Opening 50 includes a longitudinal slit 70 that is formed through net element 18. The slit divides the net element into net sections 71 and 73. Elastic loop 52, and, more particularly, section 62, is attached to the net element. Sections 71 and 73 of net element 18 are sewn, stitched, woven or tied to respective sides 67 and 69 of elastic loop 52. Accordingly, as shown in FIG. 1, each strand of net element 18 extends between two sections of elastic or resilient cord. The longitudinal strands extend generally longitudinally between lateral segments of the peripheral resilient member 20. The lateral strands of the net element extend between, at one end, one side 67, 69 of elastic loop 52 and, at the other end, a longitudinal side segment of resilient member 20.

With elastic loop 52 interconnected between clips 24 and 32 in the manner shown in FIG. 1, the elastic loop is held in an elongate, stretched condition with side sections 67 and 69 side by side. As a result, elastic loop 52 urges opening 50 into a closed condition. Slit 70 is extremely narrow. In fact, if elastic loop 52 is stretched taughtly enough, the sides of loop section 62 may touch. In such cases, the slit is non-existence or virtually non-existent. With opening 50 in a closed condition, the net completely covers the entrance to live well 12. Fish contained in chamber hold 14 of the live well are prevented from escaping.

Opening 50 is exposed to provide access to the interior live well 14 in the manner illustrated in FIG. 5. The fisherman grasps longitudinal sides 67 and 69 of elastic loop 52 with his hands H, shown in phantom, and pulls those sides apart to expand the elastic loop. This exposes opening 50 through net element 18 and provides access through the opening into hold 14 of live well 12. As the elastic loop 52 is expanded, the sections 71 and 73 of net element 18 are separated. Elastic loop 52 remains secured to clip elements 24 and 32 at end loops 58 and 60, respectively. Although the use of two hands H is depicted in FIG. 5, elastic loop 52 may be expanded and opening 50 exposed in other ways, such as by grasping only one of the sides 67 or 69 and pulling it in a sideways direction away from the other side of the elastic loop. In any case, elastic loop 52 is expanded somewhat to form an access opening through net element 18.

When the fisherman releases longitudinal sides 67 and 69, elastic loop 52 resumes its normally closed condition shown in FIG. 1. Accordingly, opening 50 exhibits a self-closing feature. This is particularly useful aboard busy fishing boats. If the door to the live well is inadvertently left open, opening 50 closes automatically when the elastic loop is released. As a result, fish are prevented from escaping by the closed net element 18, even if the door remains open.

A pair of conventional side by side live wells 14a and 14b are shown in FIG. 6. The live wells are provided with respective hatch doors 80a and 80b that are pivotally mounted adjacent the live wells by appropriate hinges 82a and 82b. A peripheral recess 84 is formed about the live wells. When door 80a is closed, its peripheral frame 86a fits in recess 84. Similarly, when door 80b is pivoted closed, its peripheral frame 86b fits in peripheral recess 84.

A first live well closure 10a, as previously described, is mounted to cover the entrance of live well 14a. A second live well closure 10b is likewise secured to cover the entrance of live well 14b. Each of closures 10a and 10b is constructed and operates analogously to previously described closure 10 in FIGS. 1–5.

As illustrated in FIG. 6, both of the doors 80a and 80b are in an open condition. Closure 10a is in the closed condition, also depicted in FIG. 1. Specifically, net element 18a extends across the opening to live well 14a. Elastic loop section 62a bordering slit 70a urges opening 50a into the normally closed condition. Slit 70a is sufficiently narrow such that fish are prevented from escaping. Somewhat of a gap is illustrated in FIG. 6 for clarity. On the other hand, in closure 10b, opening 50b is exposed by pulling apart the side segments of elastic loop 52b. Again, this may be accomplished by grasping one or both of the sides of the loop. Alternatively, the fisherman F may simply insert his hand, with or without a fish, through the opening. Because the opening is defined by elastic loop 52b, easy access is provided for the fisherman's hand. As a result, the fisherman can either quickly and securely place a freshly caught fish into the live well or remove an individual fish from the live well. As soon as the fisherman's hand is removed, the sides of elastic loop 52b are again drawn together and opening 50b closes automatically, such as in the manner shown by arrows 75 in FIG. 5.

Figure 7:
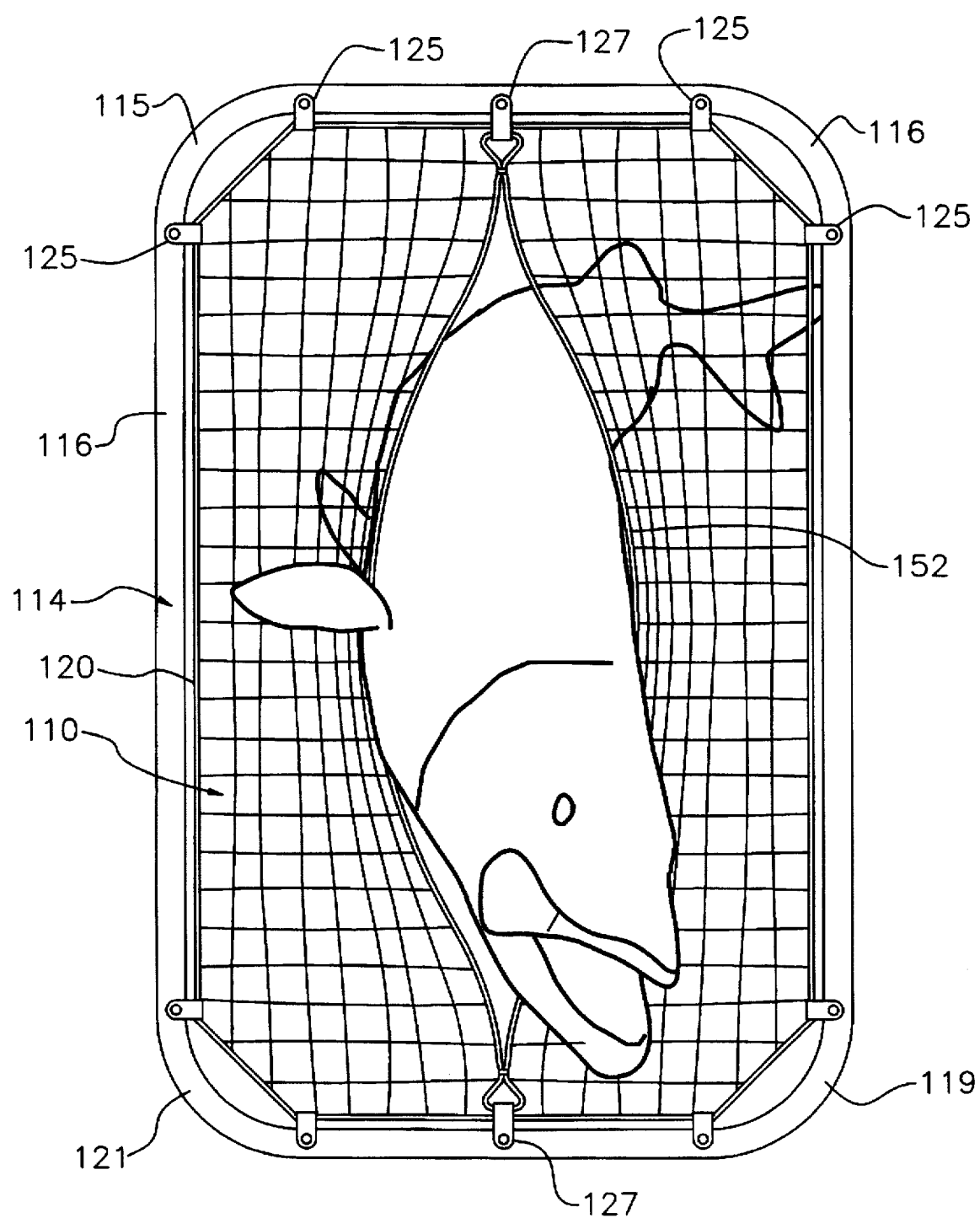
FIG. 7 is a plan view of an alternative preferred live well closure with a fish partially protruding through the expanded opening.

An alternative configuration for the closure of this invention is illustrated in FIG. 7. Therein, a closure 110 is fitted into a live well 114 having rounded corners 115, 117, 119 and 121. In this embodiment, eight connectors 125 analogous to previously described connector 22, secure a peripheral elastic cord 120 to the surrounding molding or wall 116 that defines the live well. A pair of slightly larger connectors 127, which are identical to previously described connectors 24 and 32, likewise accommodate cord 120 and also hold an elastic loop 152 that defines the self-closing opening of closure 110. This embodiment operates similarly to the previously described embodiment to hold fish securely within the live well.

An important feature of this invention is that the self-closing opening remains exposed only for as long as necessary to allow the fisherman access into the live well. As soon as access is no longer required, the opening in the net element automatically closes. Fish are prevented from jumping out of and escaping from the live well even if the door of the live well subsequently remains open.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A closure for a fisherman's live well, said closure comprising:

a flexible element, which comprises a net;

means, mounted proximate an entrance of the live well, for holding said flexible element such that said flexible element extends across and generally covers the entrance of the live well; and means defining a self-closing opening through said flexible element, which means includes elastic means that urge said opening into a closed condition and that are selectively expandable to expose said opening and provide access to the live well through said opening.

2. The closure of claim 1 in which an elongate, resilient member extends generally peripherally about said net.

3. The closure of claim 2 in which said means for holding include a plurality of connectors secured to a structure that bounds the entrance of the live well, said connectors engaging and holding said elongate resilient member.

4. The closure of claim 1 in which said net includes an elongate slit, through which said opening extends, said elastic means being attached to said net and being disposed adjacent said slit.

5. The closure of claim 4 in which said slit separates a first edge of said net from an adjacent second edge of said net and in which said elastic means include a first elongate elastic segment secured to said net and extending along said first edge and a second elongate elastic segment secured to said net and extending along said second edge.

6. The closure of claim 5 further including means located proximate the ends of said slit for gripping said first and second elastic segments and holding said segments generally side by side such that said slit is closed, said elastic segments being selectively pulled apart to open said slit and expose said opening.

* * * * *